Sept. 17, 1957 P. G. JACOBS 2,806,711
GOLF CART
Filed March 1, 1955 3 Sheets-Sheet 1
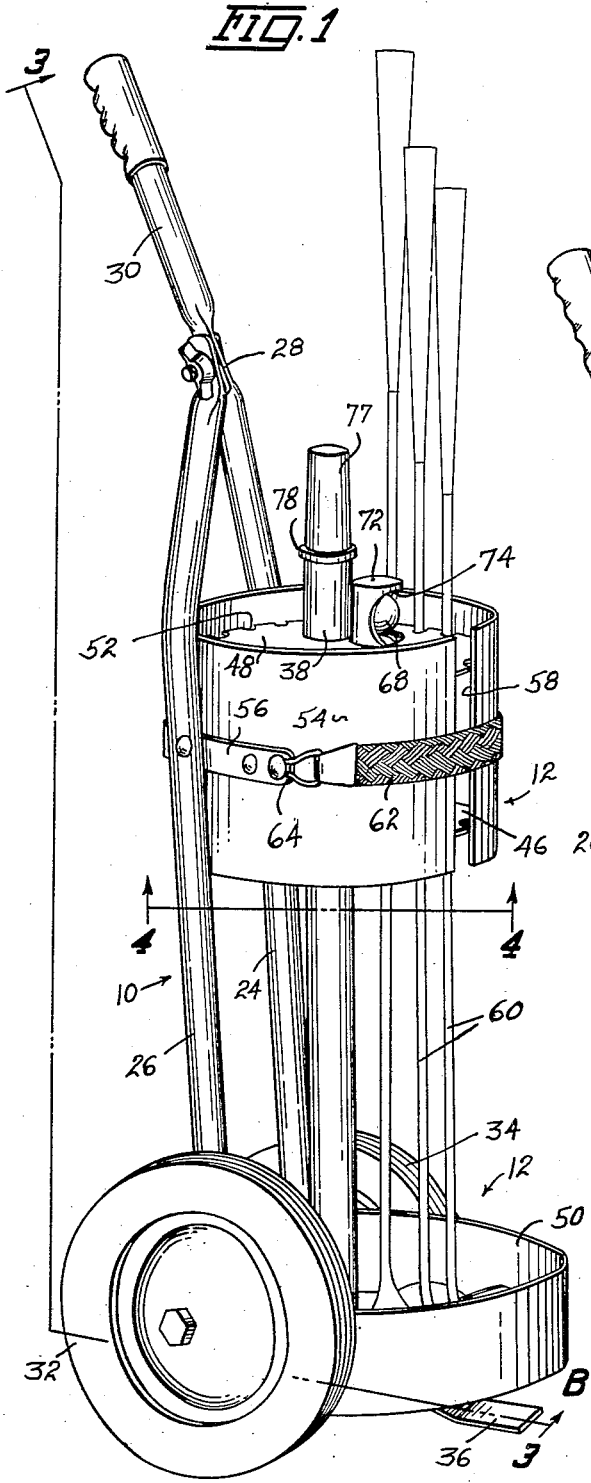
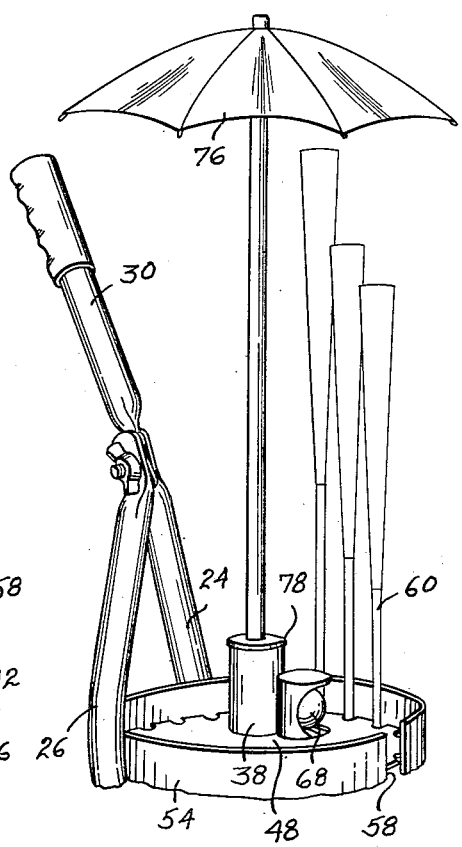
INVENTOR.
PAUL G. JACOBS
BY Talbert Dick & Adler
ATTORNEYS.

Sept. 17, 1957  P. G. JACOBS  2,806,711
GOLF CART
Filed March 1, 1955  3 Sheets-Sheet 2
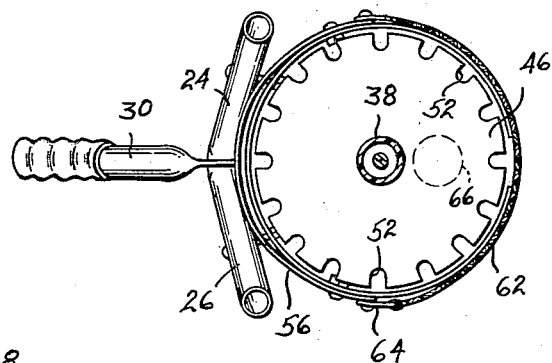
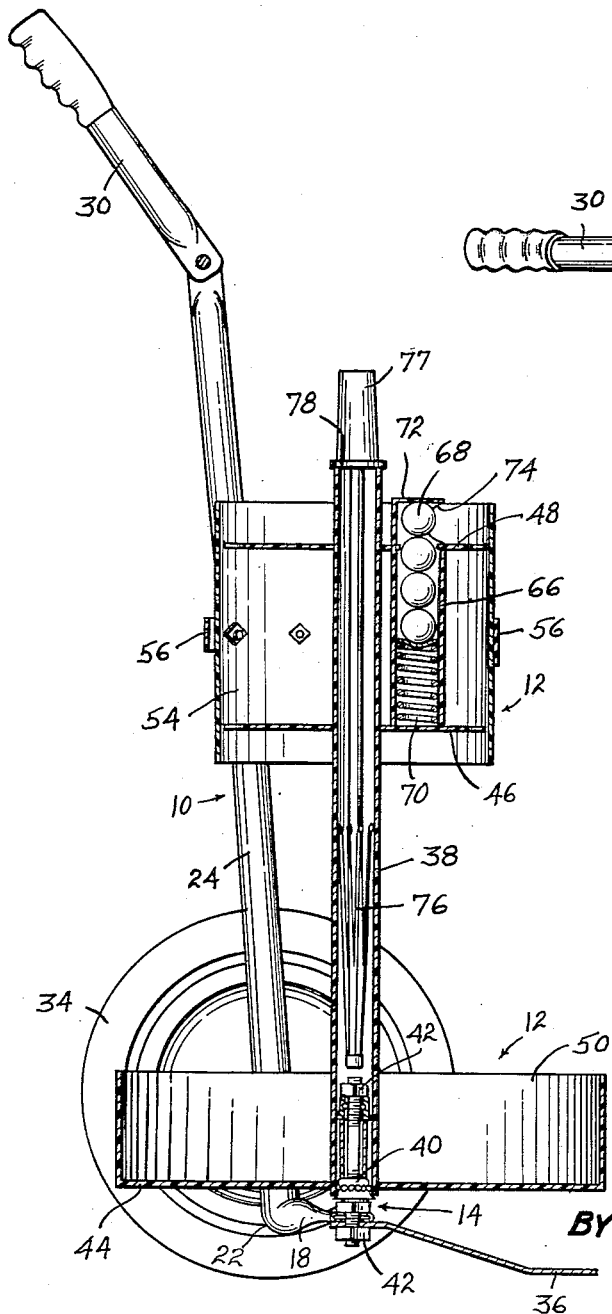
INVENTOR.
PAUL G. JACOBS
BY Talbert Dick & Adler
ATTORNEYS.

Sept. 17, 1957 P. G. JACOBS 2,806,711
GOLF CART
Filed March 1, 1955 3 Sheets-Sheet 3

INVENTOR.
PAUL G. JACOBS
BY Talbert Dick & Adler
ATTORNEYS.

2,806,711
GOLF CART

Paul G. Jacobs, Sioux City, Iowa

Application March 1, 1955, Serial No. 491,328

6 Claims. (Cl. 280—47.19)

My invention relates to improvement in golf carts and one of the important objects thereof is to provide a novel wheel mounted cart of this type for storing and transporting golf clubs and other accessories for the golfer.

More particularly it is an object of this invention to provide a golf cart where golf clubs are stored and removed individually to eliminate any scuffing of the handles or heads by keeping them from contact with each other.

Another object of my invention is to provide a cart of the above class which eliminates a bag portion as such so that the scuffing and scratching of the clubs which occurs in pushing them into regular golf bags is avoided.

Still other objects of this invention are to make a golf cart that is extremely light in weight, durable in construction and refined in appearance.

These and other objects will be apparent to those skilled in the art.

Figure 5:
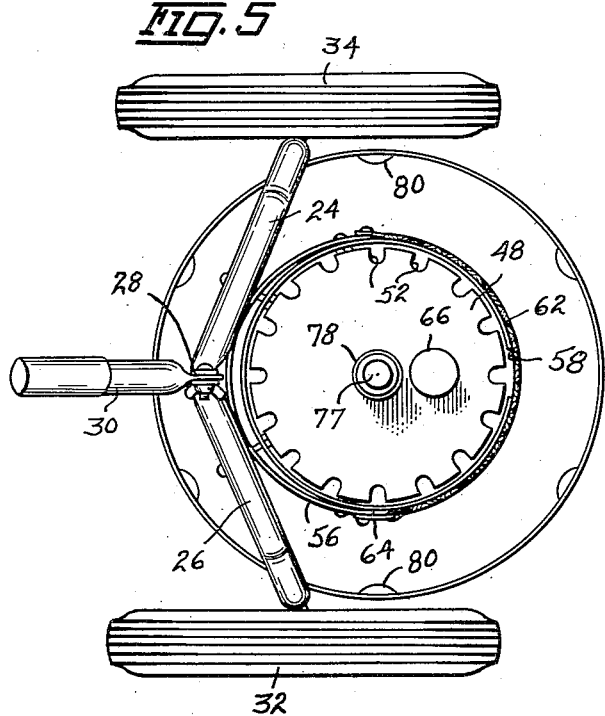
Figure 6:
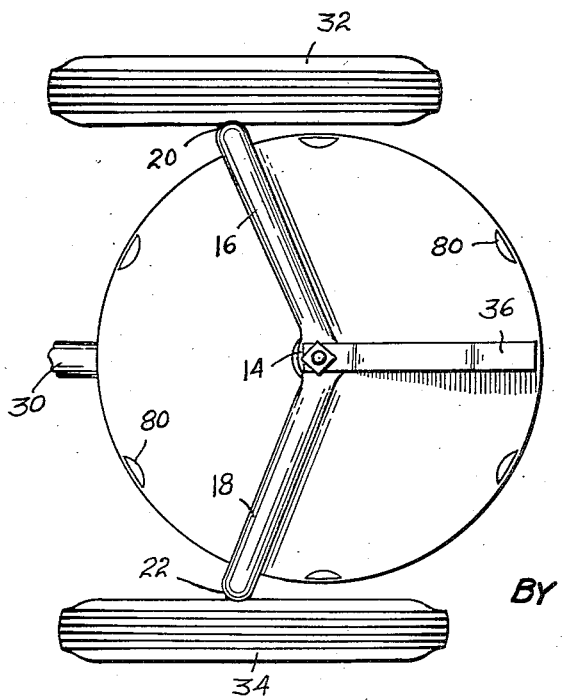

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of a golf cart illustrating a preferred embodiment of my invention, Fig. 2 is a fragmentary perspective view of the top of my cart showing an umbrella in place thereon, Fig. 3 is a longitudinal sectional view of this cart taken on the line 3—3 of Fig. 1, Fig. 4 is a bottom view of the upper cart assembly taken from the line 4—4 of Fig. 1, Fig. 5 is a top plan view of my new cart, and Fig. 6 is a bottom view thereof.

Referring to the drawings there are two basic parts involved which comprise the wheeled dolly, carriage or frame and the club assembly that are designated generally by the respective numerals 10 and 12. Substantially all of the parts are made of lightweight materials such as aluminum or plastic and preferably I have found aluminum to be highly satisfactory. The frame 10 is formed from a length of tubular material bent at its center 14 (Fig. 6) in a wide V shape to form the resulting support portions 16 and 18 which are disposed horizontally and constitute the bottom of the frame. At points equidistant from the bend 14, members 16 and 18 are bent at substantially right angles upwardly as at 20 and 22 to form the upstanding parallel frame members or struts 24 and 26 which converge at the top to a point 28 where a suitable handle 30 is adjustably attached. Wheels 32 and 34, preferably with rubber tires, are suitably mounted to the lower portions of struts 26 and 24 respectively as shown, and a rear support or rest member in the form of a bar 36 or the like is secured at one end to point 14 and extends therefrom for contact with the ground at times to support the cart in an upright position as shown in Figs. 1 and 3.

The club assembly 12 comprises a vertically disposed tubular shaft member 38 mounted at its lower end to a ball bearing cage or the like 40 which in turn, is secured to point 14 of frame 10 by nut and bolt means 42 and thus positioned, shaft 38 is freely rotatable about its vertical axis. Three discs or support members 44, 46 and 48 are concentrically mounted to tube 38 for rotation therewith with disc 44 being at the bottom and discs 46 and 48 in vertical spaced relationship at the upper portion thereof. Discs 46 and 48 are of like size and smaller in diameter than disc 44. An upstanding peripheral flange 50 is formed on disc 44, and about the perimeter of discs 46 and 48 there is formed the notches 52 in uniform spaced relationship. Notches 52 are so arranged so that each such notch on one disc is in the same vertical plane with a corresponding notch on the other disc. A collar member or cylindrical guard unit 54 embraces discs 46 and 48 very closely but leaving sufficient space for them to rotate with tube 38 and is secured to struts 24 and 26 by an arcuate band or strap 56 which extends around the forward half of member 54. The forward half as referred to and the rear as will be mentioned has reference to the usual direction of movement of the cart when it is being used and in this respect with reference to Fig. 1 it is intended that forward movement will be toward the left since handle 30 will be grasped and pulled.

On the rear side of cylinder 54 I have provided an opening or passageway 58 which is coextensive with the top and bottom edges thereof and which is made wide enough to allow the withdrawal of the shaft on a golf club 60 as will later appear. A one inch width for passageway 58 has been found to be quite adequate although such dimension may be varied if desired. Extending across opening 58 is a spring or elastic guard or band 62 that is secured to the respective ends of strap 56 and at least on one end is detachable therefrom by means of a snap connection 64 or the like.

Thus far described it is pointed out that golf clubs 60 are stored in this cart by placing the head of the club on the bottom disc 44 with the shank resting in two registering notches 52 of discs 46 and 48 respectively and with the handgrip portions projecting above disc 48 as shown. It will of course be understood that the clubs 60 are inserted into and withdrawn from the cart individually through passageway 58 and for this purpose discs 44, 46 and 48 can be freely rotated by grasping the upper portion of tube 38 or by the club handles once they are in place. In inserting or withdrawing a club 60, band 62 is adapted to be pulled away from passageway 58 sufficiently to allow freedom of movement of the clubs or it can be detached at point 64 to hang free at one side of cylinder 54. Once inserted into the cart, it will be appreciated that the clubs 60 are held in upright position by two vertically spaced support points represented by the notches 52 in discs 46 and 48 and because of the spacing of these notches are held apart one from another so there is no danger of scratching or marring by contact with each other. Likewise in the act of inserting or withdrawing of the clubs there is no club to club contact or scuffing against a bag as is common in the usual type of golf bag. Disc 44 will obviously carry the weight of the clubs and flange 50 guards against any tendency of the club heads to slide. The close proximity of collar 54 serves as a closure for the respective notches 52 to hold the clubs in place, and strap 62, when in place (Fig. 1), effectively blocks passageway 58 against any accidental movement of any club 60 therethrough.

With reference now to Fig. 3 it is pointed out that the relative positions of discs 46 and 48 are made more secure by a vertically disposed tubular column 66 mounted adjacent tube 38 so as to be secured to the top of disc 46 and to project upwardly through and secured to disc 48.

This column serves not only as a brace-like support for discs 46 and 48 but also as a carrier for golf balls 68 since that portion of disc 46 enclosed by the lower end of column 66 serves as a bottom to form column 66 into a tubular ball receptable. I have therefore placed a spring 70 in the lower end of column 66 which yieldingly urges the golf balls 68 upwardly and at the top of the column is a cap 72 to serve as a stop for the balls. This cap has a side opening 74 through which the balls can be easily manually withdrawn.

Tube 38 is adapted to house an umbrella 76 which can be stored therein as shown in Fig. 3 or used for protecting the clubs 60 as shown in Fig. 2. It is provided with a tapered cylindrical handle 77 that has a circumscribing flange 78 spaced from the end thereof so that when stored, flange 78 serves as a stop (Fig. 3) and the diameter of the handle is such that its tapered form allows it to be wedged into tube 38 (Fig. 2) when used as described. Drain holes or openings 80 may be formed at the perimeter of disc 44 to release any water that may result if this cart should be in the rain or from washing the same.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my golf cart without departing from the real spirit and purpose of my invention, and it is my intention to cover by my claims, and modified forms of structure or use of mechanical equivalents which may be reasonably included within their scope.

I claim:

1. A golf cart, comprising, a wheel mounted frame, a vertically disposed shaft mounted thereon for rotation about its vertical axis, a first golf club support member mounted to the lower end of said shaft for rotation therewith, a second golf club support member mounted to the upper portion of said shaft for rotation therewith, means on said second support member for holding a plurality of golf clubs in spaced relationship, a guard member about said second support member and secured to said frame, said second support member rotatable within said guard, said guard provided with a restricted opening through which but one golf club at a time can be passed, and a removable closure for said opening arranged on said guard.

2. A golf cart, comprising, a wheel mounted frame, a vertically disposed shaft mounted thereon for rotation about its vertical axis, a first golf club support member mounted to the lower end of said shaft for rotation therewith, a second and third golf club supporting member respectively mounted in vertical spaced relationship to the upper portion of said shaft for rotation therewith, registering means on said respective second and third support members to provide a two point support for holding a plurality of golf clubs in an upright spaced relationship with the first support means designed to support the head of such golf clubs, a guard member about said second and third support members and secured to said frame, said second and third support members rotatable within said guard, said guard provided with a restricted opening through which but one golf club at a time can be passed, and a removable closure for said opening arranged on said guard.

3. A golf cart, comprising, a wheel mounted frame, a vertically disposed shaft mounted thereon for rotation about its vertical axis, a first disc mounted to the lower end of said shaft for rotation therewith, a second disc mounted to the upper portion of said shaft for rotation therewith, a plurality of notches in uniform spaced relationship about the perimeter of said second disc designed for receiving the shank portion of a golf club with the head of such club resting on said first disc, a guard member about said second disc and secured to said frame, said second disc rotatable within said guard, said guard provided with a restricted opening through which but one golf club at a time can be passed, and a removable closure for said opening arranged on said guard.

4. A golf cart, comprising, a wheel mounted frame, a vertically disposed shaft mounted thereon for rotation about its vertical axis, a first disc mounted to the lower end of said shaft for rotation therewith, a second and third disc respectively mounted in vertical spaced relationship to the upper portion of said shaft for rotation therewith, each of said second and third discs provided on its perimeter with a plurality of spaced apart notches, each respective notch on the second disc being in the same vertical plane with one notch respectively on said third disc to provide a two point support for the shank of a golf club with the head of such club resting on said first disc, a guard member about said second and third discs and secured to said frame, said second and third discs rotatable within said guard, said guard provided with a restricted opening through which but one golf club at a time can be passed, and a removable closure for said opening arranged on said guard.

5. A golf cart, comprising, a wheel mounted frame, a vertically disposed shaft mounted thereon for rotation about its vertical axis, a first disc mounted to the lower end of said shaft for rotation therewith, a second and third disc respectively mounted in vertical spaced relationship to the upper portion of said shaft for rotation therewith, each of said second and third discs provided on its perimeter with a plurality of spaced apart notches, each respective notch on the second disc being in the same vertical plane with one notch respectively on said third disc to provide a two point support for the shank of a golf club with the head of such club resting on said first disc, a tubular support column secured between said second and third discs and projecting upwardly through the uppermost of the two, and said tubular support column also serving as a golf ball receptacle.

6. A golf cart, comprising, a wheel mounted frame, a vertically disposed shaft mounted thereon for rotation about its vertical axis, a first disc mounted to the lower end of said shaft for rotation therewith, a second and third disc respectively mounted in vertical spaced relationship to the upper portion of said shaft for rotation therewith, each of said second and third discs provided on its perimeter with a plurality of spaced apart notches, each respective notch on the second disc being in the same vertical plane with one notch respectively on said third disc to provide a two point support for the shank of a golf club with the head of such club resting on said first disc, a tubular support column secured between said second and third discs and projecting upwardly through the uppermost of the two, said tubular support column also serving as a golf ball receptacle, and means for releasably containing golf balls therein.

References Cited in the file of this patent

UNITED STATES PATENTS

| 929,897 | Taylor | Aug. 3, 1909 |
| 992,689 | Reid | May 16, 1911 |
| 1,065,381 | Martin | June 24, 1913 |
| 2,376,955 | Ball | May 29, 1945 |
| 2,480,977 | Suli | Sept. 6, 1949 |
| 2,533,541 | Warring | Dec. 12, 1950 |
| 2,570,504 | Van House | Oct. 9, 1951 |

FOREIGN PATENTS

| 660,840 | Great Britain | Nov. 14, 1951 |